United States Patent [19]

Mennenga

[11] Patent Number: 4,487,058

[45] Date of Patent: Dec. 11, 1984

[54] METHOD AND APPARATUS FOR DETECTING GAS LEAKS

[75] Inventor: Hermann Mennenga, Balzers, Liechtenstein

[73] Assignee: Balzers Aktiengesellschaft, Liechtenstein

[21] Appl. No.: 463,646

[22] Filed: Feb. 3, 1983

[51] Int. Cl.³ .............................................. G01M 3/04
[52] U.S. Cl. ............................................ 73/40.7; 73/40
[58] Field of Search .................... 73/40.7, 40, 37, 49.2

[56] References Cited

U.S. PATENT DOCUMENTS

| | | | |
|---|---|---|---|
| 2,504,530 | 4/1950 | Jacobs | 73/40.7 |
| 3,342,990 | 9/1967 | Barrington et al. | 73/40.7 X |
| 3,416,359 | 12/1968 | Durbin et al. | 73/40.7 |
| 3,520,176 | 7/1970 | Becker | 73/40.7 |
| 3,616,680 | 11/1971 | Schrader | 73/40.7 |
| 3,645,127 | 2/1972 | Mongodin et al. | 73/40.7 |
| 3,690,151 | 9/1972 | Briggs | 73/40.7 |
| 3,762,212 | 10/1973 | Morley et al. | 73/40.7 |

FOREIGN PATENT DOCUMENTS 169647  10/1982  Japan ................................. 73/40.7

*Primary Examiner*—Anthony V. Ciarlante
*Assistant Examiner*—Hezron Williams
*Attorney, Agent, or Firm*—McGlew & Tuttle

[57] ABSTRACT

Test gas passing through leaks is conducted through a conduit to the discharge end of a counterflow pump or turbo-molecular pump. The leak gases advance opposite to the pumping direction of the counterflow pump to its intake side, and is detected by a detector connected to its inlet. The heavier gases (air) interfering with the detection, for which the counterflow pump has a substantially higher compression ratio, however, are retained mostly by the detector. Heretofore, the partial pressure of the test gas in the detector or the signal given off by it were used as a measure for the test gas current passing through a leak, while according to the invention the speed of the counterflow pump is varied so long until the detector signal has a predetermined size. The invention includes a device for adjusting the speed of the counterflow pump so as to obtain a high detection accuracy at less cost than heretofore.

9 Claims, 2 Drawing Figures

METHOD AND APPARATUS FOR DETECTING GAS LEAKS

FIELD AND BACKGROUND OF THE INVENTION

This invention relates in general to vacuum pumping devices and in particular to a new and useful method for testing leaks in vacuum systems.

The present invention concerns a method and arrangement for detecting leaks in walls, where a test gas passing through leaks in a wall is fed over a line to the discharge side of a turbo-vacuum pump and arrives, opposite to the direction of conveyance, in a test gas detector connected to the intake side of the pump.

Suitable arrangements for such a method are known, e.g. from German Pat. No. 1,648,648 and Swiss Pat. No. 519,137. They work on the so-called counterflow principle. Test gas which has passed through a leak, mostly helium, arrives opposite to the direction of conveyance of a turbo-vacuum pump, in the test gas detector connected to its intake side, where it is detected.

A prerequisite for the successful application of this counterflow principle is that a counterflow pump is available which has a compression factor for the test gas which is substantially lower than the compression factor for other gases interfering with the detection of the test gas by the detector. The compression factor for the test gas must be selected so low that it can flow to the detector opposite to the direction of conveyance of the counterflow pump and build up there a measurable partial pressure, the compression factor for the interfering cases, however, should be as high as possible so that their contribution to the signal given off by the detector remains small. Turbo-vacuum pumps are particularly suitable as counterflow pumps because of their compression factor, which depends to a great extent on the molecular weight of the pumped gas.

A drawback of the counterflow principle in known arrangements, however, was the fact that, after each major peak of the partial pressure of the test gas in the detector, a relatively long recovery time was necessary until the full detection sensitivity for following weaker test gas signals could be achieved again. This limitation was mostly due to the fact that the suction power of a forepump was substantially determinant for the test gas being exhausted from the detector, which should be very high for a short recovery time but very low for a high sensitivity of leak detection.

For a conventional leak detector arrangement (see FIG. 1) with a counterflow pump applies the formula: $J/Q_{leak} = E/K.S$, where $J$ = the signal proportional to the pressure of the test gas in the detector, e.g. the current of the partial pressure analyzer in ampere;

$E$ = the sensitivity of the detector (size of signal divided by the pressure) indicated in A/mbar, for example;

$S$ = the suction power of the forepump, e.g. in liter per second;

$Q_{leak}$ = the test gas current through the leak e.g. in mbar 0.1/s;

$K$ = compression ratio of the counterflow pump for the test gas.

With a given (or desired) sensitivity E, the product K.S. must therefore be as low as possible to obtain a high resolution DELTA Q. But there are limits. K must not be too low for the interfering gases so that a sufficiently low total pressure is maintained in the detector. But the suction power S must not be too low either, otherwise the recovery time will be too long.

Practical values would be, for example:
$K = 10$, $E = 10^{-4}$ A/mbar and $S = 1$ l/s; J is thus $10^{-5}$. $Q_{leak}$, that is, for the inflow of a test gas of $10^{-5}$ to $10^{-10}$/mbar l/s it would be necessary to provide an ammeter with measuring ranges of $10^{-10}$ to $10^{-15}$ A.

Such a known arrangement has the following disadvantages:

(a) the required precision ammeter of maximum sensitivity with a measuring range extending over 5 decimal powers is very elaborate;

(b) the system must be evacuated down to the limit range of a mechanical forepump ($10^{-2}$ mbar) before the test piece can be connected; such an extensive pre-evacuation is very time consuming, however;

(c) with great leaks, the test gas concentrations in the detector are relatively high, which leads to long recovery periods.

SUMMARY OF THE INVENTION

The present invention provides a method and an arrangement for detecting leaks, which makes it possible to achieve a high accuracy at substantially lower costs.

The method according to the invention for detecting leaks in walls is characterized in that the speed of the turbo-vacuum pumps is so set that the detector gives off a signal of a predetermined size, and that this speed serves as a measure of the test gas current flowing through the leaks.

It takes into account the finding that the compression ratio K of a turbo-vacuum detector is a unique function of the rotor speed, corresponding to the formula $K = e^{\sqrt{M.U.G.}}$, where M denotes the molecular weight, U the circumferential speed of the rotor, and G a design dependent geometry factor. The new method requires no expensive measuring instrument, e.g. ammeters with a reading that is signal proportional over several decades. Rather a mere signal indicator suffices, which always yields the same reading that are exactly reproducible for a predetermined signal, but requires no additional indicating or measuring range; such indicators are moderate in price with a high accuracy (they are also used much e.g. for electric measuring bridges). The detector itself has within the framework of the invention the advantage that the signal generated by it, e.g. the output voltage, need not be proportional to the partial pressure of the test gas, and that only a narrow measuring range is required. The detector can nevertheless be highly sensitive, so that it is no longer necessary to effect the preliminary evacuation down to the efficiency limit of the forepump (that is, down to the so-called end vacuum) before starting with the detection of leaks in a test piece. Furthermore, it is then possible to use a forepump with a greater suction power; this means substantially shorter pre-evacuation periods and shorter recovery periods, so that the drawbacks of known arrangements listed under (b) and (c) or of the leak detection method according to the counterflow principle can likewise be avoided.

An arrangement according to the invention is characterized in that the turbo-vacuum pump is associated with a device for setting its speed to such a value that the detector gives off a signal of a predetermined size.

In the simplest case a potentiometer can be used, e.g. for this purpose, with which the voltage applied to the driving motor of the pump is set. Naturally any other device for adjusting the speed can be used. In a preferred embodiment of the invention, the device is designed as a regulator for the automatic adjustment of the speed to a certain size of the detector signal.

Preferably a turbo-vacuum pump is used which permits a high speed and which is so designed that it contains a possibly great number of compression stages, which are optimized to a high individual compression ratio and not to a high suction power. With such a pump the compression ratio for helium can be easily varied e.g. in a range from 20 to $10^5$, with a speed variation of 250 to 1000 Hz.

Accordingly it is an object of the invention to provide an improved method and arrangement for detecting leaks in walls and vessels which includes connecting line extending from the vessel to a vacuum pump to a turbo-molecular pump which is operated at an adjustable speed so as to permit the portion of the leak gas to be detected to pass therethrough in a direction contrary to the flow direction so that it may be detected by a detector and the speed of the pump may be varied.

A further object of the invention is to provide a method of detecting leaks in walls and vessels which comprises passing a test gas which leaks through the wall through a line to the discharge side of a turbo-vacuum pump which operates so as to permit some of the gas to arrive on its opposite intake end which is located a gas detector and wherein the speed of the turbo-vacuum pump is set so that the detector gives off a signal of a predetermined size and the adjusted speed serves as a measure for the test gas current issuing through the leaks.

A further object of the invention is to provide a device for testing for leaked gas which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
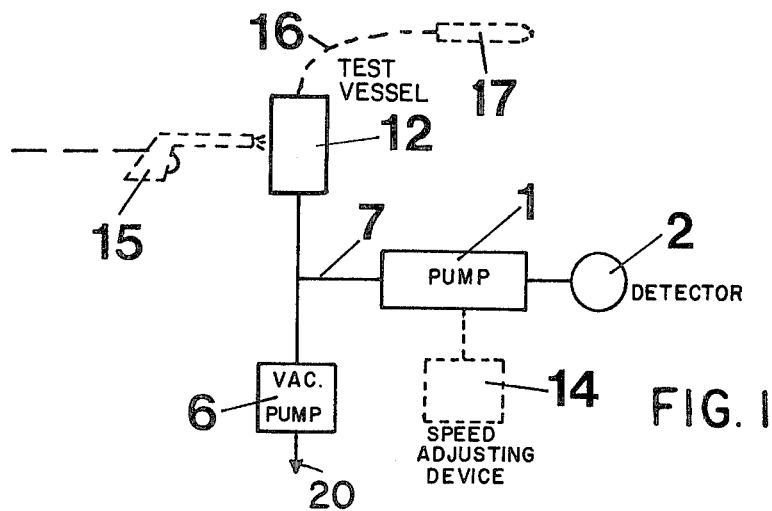
FIG. 1 is a schematic diagram of an arrangement for the detection of leaks by means of a turbo-vacuum pump employed as a counterflow pump constructed in accordance with the invention.

Referring to the drawings in particular the invention embodied therein in FIG. 1 comprises an arrangement for effecting the testing for leak gases in accordance with the invention wherein a test vessel 12 is connected to a vacuum pump 6 which is operated to evacuate the gases from the vessel in a direction of the arrow 20. In accordance with the invention, a turbo-molecular pump or counterflow pump 1 is connected through a line 7 to the connection between the vessel 12 and the vacuum pump 6 and when it operates the gases which leak into the vessel 12 are conducted in an opposite direction to the flow direction of the pump 1 and are detected by detector 2. The speed of the pump 1 is adjusted by a speed adjusting device 14, so that the detector 2 gives a predetermined signal of a predetermined value.

In FIG. 1, 12 denotes a vessel to be tested for leaks and, 6 denotes a vacuum pump or forepump for the preliminary evacuation of the system to a low pressure sufficient for the operation of counterflow pump 1 of detector 2 connected to its intake side of pump 1 (which can be a mass spectrometer, for example). For a clear distinction from counterflow pump 1, the "forepump" 6 is always designated as such, but we must keep in mind that this forepump can have several stages or be a pump stand with several partial pumps. Counterflow pump 1 too has several pumping stages and is connected over lines 7 (and 13 in FIG 2) to the test piece or can be connected if shut-off valves are provided in the respective lines.

Figure 2:
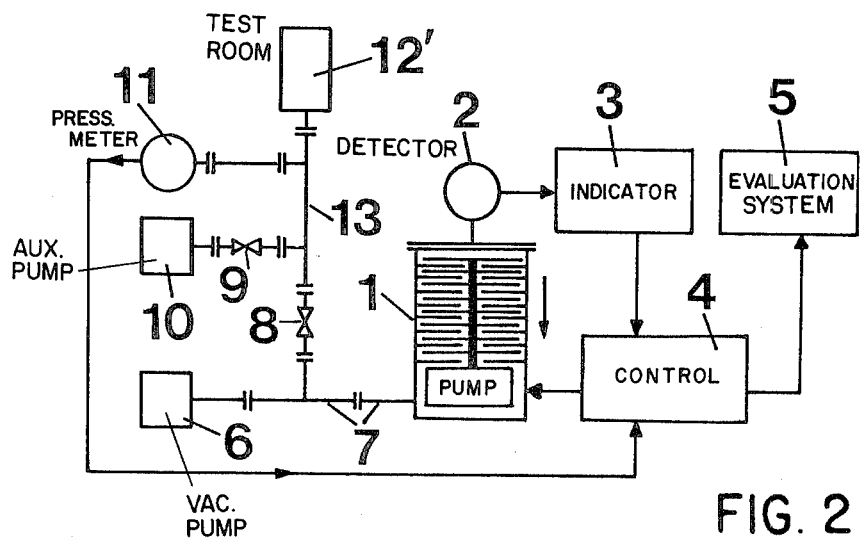
FIG. 2 is a view similar to FIG. 1 of another embodiment of the invention, wherein there is automatic regulation of the speed so that the detector gives off a signal of a predetermined size.

In FIG. 2 the same numbers as used to designate the same parts. A test room 12' replaces the test vessel 12 but this can be considered to be the same as a test vessel.

If the method according to the invention is to be carried out with this known arrangement, an additional device 14 for adjusting the speed of the pump must be provided, which is indicated in FIG. 1 by broken lines.

The leak detection process is so effected that, after corresponding pre-evacuation of the entire system by forepump 6, counterflow pump 1 is started and the test vessel 12 is sprayed from the outside with test gas by means of a so-called test gas gun 15. If vessel 12 has leaks, the test gas penetrates into the interior of the test vessel and arrives over lines 13 and 7 at the discharge side of the counterflow pump 1. Since the compression ratio of the pump 1 for the test gas is very low, the leak gas can advance partly to detector 2 (opposite to the direction of conveyance indicated by an arrow 20), and the leak gas thus gives off a signal for the partial pressure of the test gas in the detector. If it is above a predetermined value, it can be reduced by increasing the speed of pump 1, but if the signal indicates a partial pressure below the predetermined value, it can be increased by correspondingly reducing the speed, that is, it is possible in each case to bring the signal to the predetermined value by adjusting the speed.

Since the speed corresponds to a certain compression ratio, that is, to a certain ratio of the test gas pressure at the discharge side to that at the intake side of the pump, this also means a certain test gas pressure in line 7 and thus in vessel 12 connected to the line 7. The partial pressure of the test gas in the line 7 in turn represents according to the above-indicated formula a unique measure for the inflow of test gas, that is, the size of the leak, when the sensitivity of the detector and the suction power of the forepump are given.

The preferred embodiment according to the invention shown in FIG. 2 has, apart from the above-described essential parts as shown in FIG. 1, in addition an auxiliary pump 10 and a valve 9, so that test room or vessel 12' can be evacuated separate from the rest of the vacuum system. Another valve 8 is provided for the selective connection or disconnection of the test piece from counterflow line 7. The signal given off by detector 2 is fed in this arrangement (for simultaneous visual observation) to an indicator 3 and furthermore to a control device 4, which has the function in the sense of the invention to adjust the speed of counterflow pump 1 during the leak detection process to obtain a predetermined value of the detector signal. The adjusted speed is then a measure for the inflow of test gas through the leak.

A signal corresponding to the speed can be fed from control device 4 to an electronic evaluation system 5, and the size of the leak can be indicated by the latter in a desired unit, e.g. in torr liter per second. The pressure of the sum of all gases in test piece 12' can be measured with the total pressure meter 11, and this measured quantity can also be used to run pump 6 over the above-mentioned control device in the pre-evacuation phase, that is, as long as the total pressure in the test piece is too high, with the maximum speed, hence with the greatest suction power to always provide the same starting conditions for the following test piece. Furthermore, the signal of total pressure meter 11 can also be used for controlling valve 8 to connect the test piece to counterflow line 7.

A leak detection process with the arrangement according to FIG. 2 takes place as follows: First valves 8 and 9 are closed, test piece 12' is flanged. Pressure meter 11 signals a too high pressure and the speed of pump 6 is switched to maximum. Valve 9 is then opened and test piece 12 is evacuated by means of auxiliary pump 10. As soon as the pressure in the latter has a sufficiently low value (e.g. 1 mbar), valve 8 can be opened. If there is no great leak in the test piece, the pressure will drop further, and as long as no test gas enters the speed of pump 1 is regulated down to a minimum value, due to the small signal given off by the detector. Then valve 9 is closed and the test piece is charged with test gas. In the case of a leak, the detector signal will rise, and the speed will vary correspondingly, thanks to the regulation, until the predetermined value of the detector signal, and thus a certain speed has been achieved.

It should be added that leaks can also be detected in a vessel in this way that it is filled with the test gas of a certain pressure and its outside is scanned for any test gas issuing through leaks. To this end are used so-called "snifflers" by which a part of the test gas issuing from the vessel is taken-in, together with air, and fed to the detector. The arrangement can be principally the same as in FIG. 1, only 12' represents in this case not a vessel to be tested, but a room in which a vacuum is produced by forepump 6, and test gas is in this case sucked-in through the connected line 16 of sniffler 17. The test gas through-put through room 12' measured by the speed adjustment of the counterflow pump then naturally does not mean the test gas current passing through the leak in the test vessel, but only a part of the latter. But this method is nevertheless suitable for finding the location of a leak and for a rough estimate of its size.

By "signal of a predetermined size" we mean in the sense of the present invention also the case where the signal is within a predetermined tolerance range, as well as the case where its value does not rise or fall below a certain limit value. In the standard testing of vacuum vessels for leaks, it suffices, e.g. to provide only two speed stages for two quality stages of which the lower one, for example, indicates that the test piece is completely tight, while it is less tight when it is necessary to switch to the higher speed, to bring the detector reading within the tolerance range, or it represents waste if it is not possible at all.

By a turbo-vacuum pump in the sense of this specification we understand a vacuum pump where a motion pulse in the direction of conveyance must be imparted to the gas to be conveyed by rapidly rotating parts, like blades or rotating discs. In the sense of this specification, the said term thus comprises both turbo-vacuum pumps which work in the viscous flow range and those which convey gases at low pressures in the range of the molecular flow. (In the case of gases the pulse is transmitted by the moving part to each individually conveyed gas molecule, and these pumps are frequently also called turbo-molecular pumps).

By the stages of a turbo-vacuum pump we understand the individual blade rings or discs which convey the gas in pumping direction when they rotate, compressing it by a certain factor.

While specific embodiments of the invention have been shown and described in detail to illustrate the application of the principles of the invention, it will be understood that the invention may be embodied otherwise without departing from such principles.

What is claimed is:

1. A method of detecting leaks of a gas in a vessel, comprising: connecting the vessel containing the gas to be detected to a vacuum pump, the connection also being connected to a turbo-molecular pump for pumping the gas in a pump direction; sensing, with a detector, the gas from the vessel which passes through the turbo-molecular pump in a direction opposite to the pump direction; regulating a pumping speed of the pump so that the detector gives off a signal of a predetermined size; and thereafter adjusting the pumping speed to maintain the signal as a measure of gas leaking into the vessel.

2. A method according to claim 1, wherein the predetermined size of the detector signal comprises a range with an upper and lower limit value.

3. A method according to claim 1, wherein during operation the turbo-molecular pump is maintained at a speed to provide a given detector signal and thereafter adjusting the speed of the pump and observing this adjustment as a signal of variation of the leaking gas.

4. A method according to claim 1, wherein the turbo-molecular pump is connected directly to a vessel in which leaks may occur.

5. A method according to claim 1, wherein the turbo-molecular pump is connected to a connection through which the vessel is connected.

6. A method according to claim 1, wherein a control is connected to the pump to vary its speed, said detector is connected to said control and provides means for varying said control to vary the speed of said pump.

7. A device for testing for leaks in a room comprising: an evacuation line extending from said room; a turbo-molecular pump having an outlet connected to said evacuation line; speed-control means for driving said pump at a selected speed; detector means connected to an inlet of said pump for determining an amount of leaking gas passing through said pump in a reverse direction from said outlet to said inlet; and control means connected between said detector means and said speed control means for varying a speed of said pump to maintain a selected detector signal from said detector means, the speed being a measure of an amount of gas leaking into the room.

8. A device according to claim 7, wherein said turbo-vacuum pump has a plurality of stages and is dimensioned for a high compression ratio relative to its suction power.

9. A device according to claim 7, wherein said device comprises a regulating device for the automatic speed of said turbo-pump from dependence upon the reading of said detector.

* * * * *